United States Patent
Hornung et al.

(10) Patent No.: US 7,060,242 B2
(45) Date of Patent: Jun. 13, 2006

(54) METHOD FOR TREATING WASTE MATERIALS CONTAINING HALOGEN

(75) Inventors: Andreas Hornung, Karlsruhe (DE); Aliaksandr Balabanovich, Karlsruhe (DE); Susanne Donner, Karlsruhe (DE); Helmut Seifert, Ludwigshafen (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 11/046,649

(22) Filed: Jan. 28, 2005

(65) Prior Publication Data
US 2005/0142057 A1 Jun. 30, 2005

Related U.S. Application Data

(63) Continuation-in-part of application No. PCT/EP03/006425, filed on Jun. 18, 2003.

(51) Int. Cl.
*A62D 3/00* (2006.01)

(52) U.S. Cl. ............... 423/488; 423/481; 423/245; 423/DIG. 12; 588/314

(58) Field of Classification Search ........... 423/481, 423/483, 488, DIG. 12, 245.1, 245.2; 588/314
See application file for complete search history.

(56) References Cited

U.S. PATENT DOCUMENTS

| | | | |
|---|---|---|---|
| 3,941,066 A * | 3/1976 | Itoh et al. ............... 110/346 |
| 4,982,027 A | 1/1991 | Korff et al. ............. 585/241 |
| 5,464,602 A * | 11/1995 | Evans et al. ............ 423/488 |
| 5,597,451 A * | 1/1997 | Nagai et al. ............... 201/4 |
| 5,688,335 A | 11/1997 | Krabbenhoft et al. ..... 134/19 |
| 6,653,410 B1 * | 11/2003 | Fujisawa et al. ......... 525/366 |

FOREIGN PATENT DOCUMENTS

| | | |
|---|---|---|
| BE | 903 383 | 4/1986 |
| EP | 0 554 761 | 8/1993 |
| WO | WO83/04259 | 12/1983 |
| WO | WO 96/27412 | 9/1996 |

* cited by examiner

*Primary Examiner*—Ngoc-Yen Nguyen
(74) *Attorney, Agent, or Firm*—Klaus J. Bach

(57) ABSTRACT

In a method for the treatment of halogen containing waste materials wherein valuable materials and/or energy can be recuperated without the generation of additional halogenated waste materials, the halogen containing waste materials are mixed with a molten substituted or non-substituted polyolefin in an inert gas atmosphere, whereby, upon melting, hydrogen halogenides are formed and the hydrogen halogenides are separated from the mixture.

6 Claims, No Drawings

METHOD FOR TREATING WASTE MATERIALS CONTAINING HALOGEN

This is a Continuation-In-Part Application of International Application PCT/EP03/006425 filed Jun. 18, 2003 and claiming the priority of German application 102 34 837.5 filed Jul. 31, 2002.

BACKGROUND OF THE INVENTION

The invention relates to a method for treating waste materials containing halogen, especially, bromide, permitting the recycling of useful materials while generating energy.

Electrical and electronic waste materials contain a number of toxic compounds. Among these toxic compounds are mainly halogenated hydrocarbons, especially brominated hydrocarbons. Brominated hydrocarbons are often used in fire protection mediums. The bromine content may be 20 to 40 wt %. In many cases, tetrabromine biphenol A is used in fire-retarding agents. Other often used bromine-containing compounds are polybrominated diphenyl ether and B is (Tribromine phenoxy)ethane. But also chlorine containing hydrocarbons and hydrocarbons which contain chlorines as well as bromine, are important.

A common method for treating waste materials containing toxic compounds is to subject them to a pyrolysis process. Compared with other decontamination processes such as combustion or deposition, pyrolisis has the advantage that chemical compounds and energy can be recuperated. However, in connection with waste material containing halogens and particularly bromine and chlorine, this method is problematic since a wide spectrum of additional compounds is generated. For example, tetrabrominebiphenol A forms toxic mono- and di-bromine phenols. Other typical pyrolysis products are halogenated p-debenzodioxines (PBDD) and p-dibenzofuranes (PBDF). The advantage of energy generation and material recuperation is therefore counterbalanced by the toxicity of the pyrolysis products.

DE 44 25 658 C1 discloses that the polyhalogenated compounds can be removed from the exhaust gas of a combustion plant by contact with polyolefins, particularly polyethylene and polypropylene. However, in that case, the polyhalogenated compounds are adsorbed in the polyolefins only reversibly so that they can again be desorbed under suitable conditions. For a long-term immobilization of these halogenated toxic compounds polyolefins are not suitable as adsorption materials under the limit conditions as described in the cited patent.

It is the object of the present invention to provide a method for the treatment of waste materials containing halogenated, particular bromine-containing compounds, wherein valuable compounds and/or energy can be recuperated as it is generally possible with pyrolysis methods and the waste materials are destroyed at least to a large extent, whereby essentially no additional halogenated hazardous materials are generated.

SUMMARY OF THE INVENTION

In a method for the treatment of halogen containing waste materials wherein valuable materials and/or energy can be recuperated without the generation of additional halogenated waste materials, the halogen containing waste materials are mixed with a molten substituted or non-substituted polyolefin in an inert gas atmosphere, whereby, upon melting, hydrogen halogenides are formed and the hydrogen halogenides are separated from the mixture.

Under halogenated waste materials particularly waste materials from the manufacture of components of the electrical and electronic industry but also electrical and electronic apparatus as such or the components thereof are to be understood. The most important application of the method is its application to halogenated, preferably brominated hydrocarbons which are used in the industry for electrical insulations and/or fire protection. The mixing with the halogen containing waste material occurs with a molten polyolefin, whose temperature corresponds at least to the melting temperature of the waste material.

The method is performed in all its variants under an inert gas atmosphere since otherwise the polyolefin may burn at the processing temperatures. For establishing the inert gas atmosphere the usual protective gases may be used. In any case, it is important that no oxygen is present. The method can be performed under normal pressure but also under an increased pressure for example up to 10 bar.

Some polyolefins melt also under an inert gas atmosphere while, at the same time, they are decomposed. The decomposition may occur already at the melting point. Where, in the description of the method, reference is made to a melting point, the transition from the solid phase to the liquid phase is meant wherein a chemical decomposition is negligible. The beginning of the decomposition of the polyolefin during melting does not detrimentally affect the method.

Basically, the halogen-containing waste materials can be mixed with the molten polyolefin in a solid and not pretreated form. The results however are less satisfactory if, at the temperature at which the polyolefin is melted, the waste materials remain solid. For example, it is less advantageous to subject to the method according to the invention solid components, such as transformers without additional pretreatment. Rather the waste materials should be separated to such an extent that, at the temperature at which the polyolefin is melted the materials to be treated are at least liquid but preferably gaseous. In practice, this means that, before the start of the procedure, metals such as housing parts or support structures should be separated at least roughly from the chemical compounds for electrical insulation and fire protection.

For waste materials containing halogen which are gaseous at the melting point of the polyolefin melt, a method variant is particularly suitable according to which molten polyolefin is provided and the gaseous halogen containing waste material is conducted through the liquid polyolefin and, in this way, mixed with the polyolefin melt. In this way, a particularly intense mixture of polyolefin and waste material is obtained whereby substantially higher yields can be achieved then with other variants of the method.

The two most simple polyolefins, polyethylene and polyproplyene are particularly suitable for the method according to the invention. Their melting point is in the area of about 200° C. The method can therefore be performed—depending on the nature of the waste material—in a temperature range between 200° C., which is the melting point of the olefin, and 500° C. If no materials are used which are difficult to convert, a temperature range slightly over the melting temperature, that is, about 50° C. to maximally 200° C. above the melting temperature is preferred.

In place of the un-substituted polyolefin polyethylene and polypropylene also substituted polyolefins may be used. As substituted polyolefin polyvinyl alcohol is particularly suitable.

During the reaction of the halogen-containing waste material with the polyolefin, the halogen content is removed from the waste material whereby hydrogen halides are formed. Since—as initially mentioned—in the electrical and electronic area, many bromine-containing compounds are used, hydrogen bromide is formed during the execution of the method. Hydrogen bromide is of substantial value and is therefore preferably separated during processing from the other start-out and reaction products and is collected. This can be done without difficulties since hydrogen bromide is gaseous under reaction conditions and, if at all, needs to be separated only from the gaseous halogen containing waste materials.

The thermal treatment of bromine-containing hydrocarbons without the use of reaction partners results at temperatures above 270° C. in the splitting of the carbon—bromine bond. With aromates then phenyl- and bromine radicals are formed. The stabilization of phenyl radicals can be achieved for example by radical recombination with another aromatic compound. This reaction path leads to the formation of biphenyl derivatives, to carbonization and to the formation of PBDD and PBDF (Eiton J. C. Borojowich, Zeev Aizenshtat, "Thermal behavior of brominated and polybrominated compounds II. Pyroproducts of brominated phenols as mechanistic tools", Journal of Analytical and Applied Pyrolysis 63 (2002) 129–145).

It has been found that the formation of PBDD and PBDF can be effectively suppressed if the pyrolysis occurs in the presence of polyolefins, particularly polyethylene and polypropylene. In that case, the phenyl- and bromine radicals appear to attack the macromolecules of the polyolefin with hydrogen abstraction, so that, in this way, a de-brominization occurs. Starting out for example with bromine phenol and polypropylene, phenol and hydrogen bromide are obtained as the main products. As by-products, alkyl phenols and alkyl bromides are formed. An addition of polyethylene or polypropylene causes the radicals to form stable molecules whereby the formation of PBDD and PBDF is avoided.

The reaction can be performed in a conventional way. The volume rates between the halogen containing waste material and the polyolefin to be used can be calculated based on the knowledge of the halogen content. The optimal process temperature can be determined by a few tests. In a usable method polyolefin is continuously melted in a reactor and a gaseous flow of the halogen containing waste material is conducted through the molten polyolefin. The hydrogen bromide formed in this way is separated continuously from the remaining waste material. The remaining waste material can be recycled.

Below the invention will be explained in greater detail on the basis of an exemplary embodiment.

EXAMPLE

Various stoichiometric mixtures of substituted or unsubstituted polyolefins were converted with bromine containing compounds in closed and open reaction systems. Among several possible test settings, a suitable setup is described by the following specifications: 80 mg tetrabromine biphenol A or 2,4-dibromine phenol are introduced under a nitrogen cover atmosphere together with 15 mg polypropylene into a glass ampulla of 6.5 cm length and 6 mm diameter. The ampulla is then melted closed and pyrolized at 350° C. for 20 minutes.

A gas chromatography/mass spectrometry examination of the pyrolysis products shows that phenol, alkyl phenol and hydrogen bromide are the main products. Bromine-containing compounds, particularly polybrominated dibenzodioxene and furons are not detectable.

What is claimed is:

1. A method for the treatment of bromine-containing waste materials, comprising the steps of:
   a) mixing the bromine-containing waste materials with a molten polyolefin in an inert gas atmosphere thereby forming hydrogen bromide, and
   b) separating the hydrogen bromide formed.

2. A method according to claim 1, wherein at least one of polyvinyl alcohol, polyethylene and polypropylene is used as polyolefin.

3. A method according to claim 1, wherein the molten polyolefin has a temperature of between the melting point of the polyolefin and 500° C.

4. A method according to claim 1, wherein the bromine containing waste materials used are gaseous at a temperature above the melting point of the polyolefin.

5. A method according to claim 4, wherein the halogen containing waste materials are mixed with the polyolefin by conducting the gaseous waste products through the molten polyolefin.

6. A method according to claim 1, wherein hydrogen bromide formed in the process is collected and isolated.

* * * * *